(12) United States Patent
Yano et al.

(10) Patent No.: US 10,242,950 B2
(45) Date of Patent: Mar. 26, 2019

(54) SEMICONDUCTOR DEVICE, METHOD OF MANUFACTURING THE SAME AND GENERATION METHOD OF UNIQUE INFORMATION

(71) Applicant: Winbond Electronics Corp., Taichung (TW)

(72) Inventors: Masaru Yano, Taichung (TW); Pin-Yao Wang, Hsinchu (TW)

(73) Assignee: Winbond Electronics Corp., Taichung (TW)

( * ) Notice: Subject to any disclaimer, the term of this patent is extended or adjusted under 35 U.S.C. 154(b) by 28 days.

(21) Appl. No.: 15/631,889

(22) Filed: Jun. 23, 2017

(65) Prior Publication Data

US 2017/0373015 A1 Dec. 28, 2017

(30) Foreign Application Priority Data

Jun. 24, 2016 (JP) .................................. 2016-125760

(51) Int. Cl.
*G06F 17/50* (2006.01)
*G06F 19/00* (2018.01)
(Continued)

(52) U.S. Cl.
CPC .......... *H01L 23/544* (2013.01); *G05B 19/128* (2013.01); *G11C 16/22* (2013.01);
(Continued)

(58) Field of Classification Search
CPC ............. G06F 17/5081; G06F 17/5072; G06F 2217/12; G06F 19/00; H01L 22/20; H01L 24/49; H01L 2223/5444
(Continued)

(56) References Cited

U.S. PATENT DOCUMENTS 6,738,682 B1 * 5/2004 Pasadyn ................ G05B 13/04
700/100
8,185,369 B2 * 5/2012 Haussler ........ G01R 31/318357
703/14

(Continued)

FOREIGN PATENT DOCUMENTS

JP 2006-156778 A 6/2006
JP 2013-502876 A 1/2013
(Continued)

*Primary Examiner* — Phallaka Kik
(74) *Attorney, Agent, or Firm* — Muncy, Geissler, Olds & Lowe, P.C.

(57) ABSTRACT

A semiconductor device with improved generation function of unique information is provided. The semiconductor device includes an integrated circuit designed or fabricated based on a general design condition or manufacturing condition, an input/output circuit, and a unique-information generation circuit to generate unique information of the semiconductor device. The unique-information generation circuit includes a circuit for PUF and a code-generation unit. The circuit for PUF is fabricated based on the design condition or manufacturing condition which is different from the general design condition or manufacturing condition and has a factor which makes variations of circuit components become large. The code-generation unit generates codes based on the output of the circuit for PUF.

12 Claims, 9 Drawing Sheets

| Manufacturing condition | Forming LDD | Channel implantation |
|---|---|---|
| Integrated circuit | Yes | performing low-concentration ion implantation on the surface of the substrate |
| PUF circuit | No | performing low-concentration ion implantation at a position that is deeper than the surface of the substrate |

(51) Int. Cl.
  *H01L 23/00*    (2006.01)
  *H01L 23/544*   (2006.01)
  *G05B 19/12*    (2006.01)
  *G11C 16/22*    (2006.01)
  *H01L 21/66*    (2006.01)

(52) U.S. Cl.
  CPC .............. *H01L 22/20* (2013.01); *H01L 24/49* (2013.01); *G06F 17/5072* (2013.01); *G06F 17/5081* (2013.01); *G06F 19/00* (2013.01); *H01L 2223/5444* (2013.01)

(58) Field of Classification Search
  USPC .............. 716/110, 54, 56; 700/98, 111, 121; 326/41, 47, 101; 257/798; 438/5, 48, 438/800
  See application file for complete search history.

(56) References Cited

U.S. PATENT DOCUMENTS

| | | | | |
|---|---|---|---|---|
| 2003/0202412 | A1* | 10/2003 | Nii | G11C 7/22 |
| | | | | 365/210.1 |
| 2004/0000944 | A1* | 1/2004 | Cho | G01R 31/2621 |
| | | | | 327/391 |
| 2005/0027501 | A1* | 2/2005 | Chen | G06F 17/5036 |
| | | | | 703/14 |
| 2006/0273841 | A1* | 12/2006 | Hanson | G11C 17/18 |
| | | | | 327/525 |
| 2009/0222775 | A1* | 9/2009 | Idgunji | G06F 17/505 |
| | | | | 716/106 |
| 2010/0037193 | A1* | 2/2010 | Kyoh | G03F 1/36 |
| | | | | 716/113 |
| 2010/0274515 | A1* | 10/2010 | Hoss | A61B 5/14532 |
| | | | | 702/104 |
| 2011/0055851 | A1* | 3/2011 | Potkonjak | G06F 21/74 |
| | | | | 719/318 |
| 2011/0126163 | A1* | 5/2011 | Habitz | G06F 17/5031 |
| | | | | 716/108 |
| 2014/0059508 | A1* | 2/2014 | Oh | G06F 17/5036 |
| | | | | 716/113 |
| 2015/0278505 | A1* | 10/2015 | Lu | H04L 9/0866 |
| | | | | 726/19 |
| 2016/0063149 | A1* | 3/2016 | Caunegre | G06F 17/5036 |
| | | | | 716/133 |

FOREIGN PATENT DOCUMENTS

| | | |
|---|---|---|
| JP | 2013-545340 A | 12/2013 |
| JP | 2015-080252 A | 4/2015 |
| JP | 2015-525979 A | 9/2015 |
| JP | 2016-012931 A | 1/2016 |

* cited by examiner

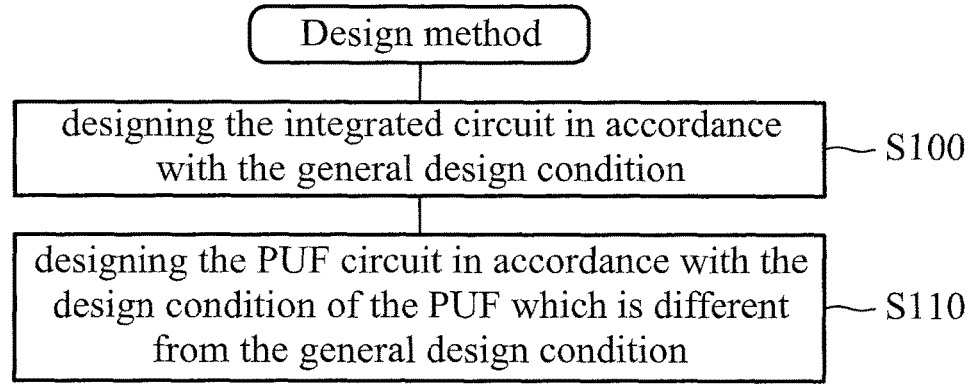
FIG. 3
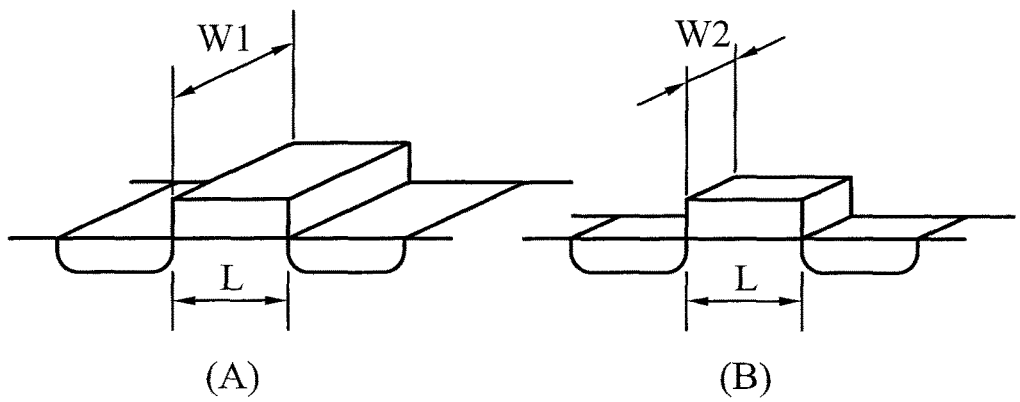
FIG. 4
FIG. 5

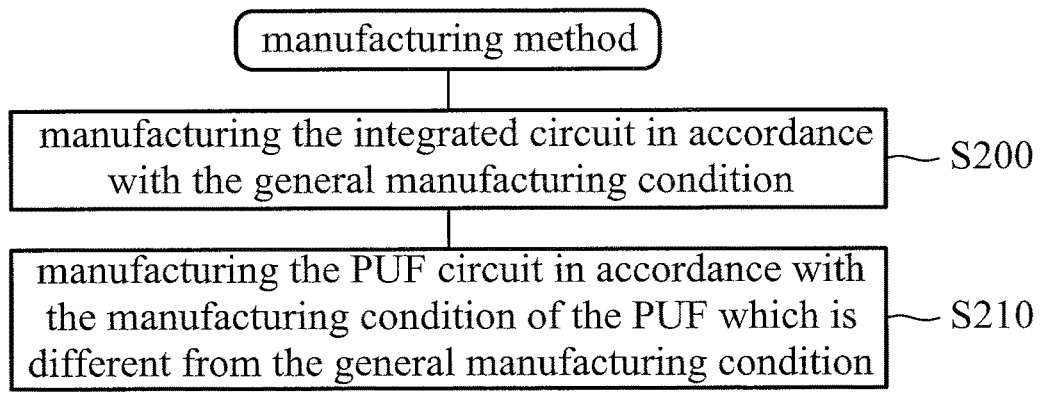
FIG. 7
| Manufacturing condition | Forming LDD | Channel implantation |
|---|---|---|
| Integrated circuit | Yes | performing low-concentration ion implantation on the surface of the substrate |
| PUF circuit | No | performing low-concentration ion implantation at a position that is deeper than the surface of the substrate |
FIG. 8
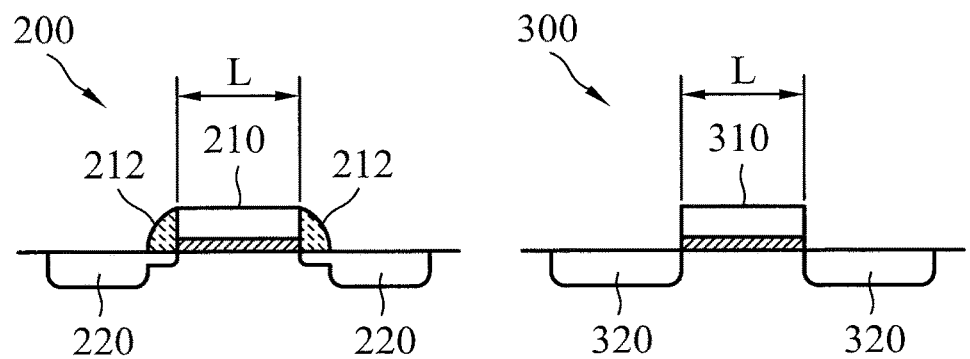
FIG. 9

SEMICONDUCTOR DEVICE, METHOD OF MANUFACTURING THE SAME AND GENERATION METHOD OF UNIQUE INFORMATION

CROSS REFERENCE TO RELATED APPLICATIONS

This Application claims priority of Japanese Patent Application No. JP2016125760, filed on Jun. 24, 2016, the entirety of which is incorporated by reference herein.

BACKGROUND OF THE INVENTION

Field of the Invention

The present invention relates to a semiconductor device having a unique-information generating function, and in particular it relates to a unique-information generating method using the circuit component of a semiconductor device.

Description of the Related Art

In recent years, the safety of electronic components and electronic devices has been enhanced. There is a need to provide countermeasures for fake and counterfeit semiconductor devices which are actually installed in electronic components and electronic devices. Some techniques provide unique information to the semiconductor device. When this unique information is authenticated, the semiconductor device works as a real object and allows the operation of the semiconductor device and the electronic device. Unique information may be stored in a nonvolatile memory of a semiconductor device or the like. However, in such cases, there may be a risk that the unique information can be read by analyzing the semiconductor device or by improperly accessing the semiconductor device from the outside.

Therefore, Physical Unclonable Function (PUF) technology, which cannot be physically copied, has recently become popular. PUF technology utilizes information which is unpredictable, highly confidential, and has permanent physical characteristics that serve as unique information. For example, the digital value generating apparatus and method of Patent Document 1 disclose a technique for generating an unique digital value by using the process variation of a semiconductor. The semiconductor device of Patent Document 2 discloses a technique for reading unique information from a memory section corresponding to a unique code generated from an unique code-generation circuit.

PATENT DOCUMENTS

Document 1: Japan laid-open patent application 2015-80252

Document 2: Japan laid-open patent application 2016-12931

BRIEF SUMMARY OF THE INVENTION

Problem to be Solved by the Invention

In the design/manufacture of a semiconductor device, the technique which suppresses the variation (fluctuation) of a circuit component (such as a transistor) or minimizes the variation is utilized to provide a semiconductor device with high reproducibility and reliability. However, when the unique information is generated by the process variation of the semiconductor device (as per patent document 1), minimizing the variation of the circuit components provides uniformity of circuit components, which reduces the randomness (non-predictability) of the unique information. In addition, the output characteristics of the transistor change when the temperature changes. In applications which use a transistor with the small variation, the unique information may be changed and is difficult to maintain permanence.

The present invention can solve the aforementioned problem and provide a semiconductor device having the function of generating better unique information.

Technical Means to Solve the Problem

The method for manufacturing a semiconductor device according to the present invention includes manufacturing the first circuit and the second circuit; wherein the first circuit is designed and manufactured in accordance with the first design and manufacturing conditions, and the second circuit is designed and manufactured in accordance with the second design and manufacturing conditions. When the second design and manufacturing conditions are compared with the first design and manufacturing conditions, the second design and manufacturing conditions further include a factor which increases the variation of the circuit component. The semiconductor device has a function of generating unique information based on the output of the circuit component of the second circuit.

Ideally, the first design condition comprises setting the channel width of the transistor as the channel width W1, and the second design condition comprises setting the channel width of the transistor as the channel width W2 which is less than the channel width W1. Ideally, the channel width W1 is the design-allowable value, and the channel width W2 is a value that is less than the design-allowable value. Ideally, the first manufacturing condition comprises setting the diffusion region of the transistor having a channel length less than a constant value as an LDD structure, and the second manufacturing condition comprises not setting the diffusion region of the transistor having a channel length less than the constant value as the LDD structure. Ideally, the first manufacturing condition comprises performing channel-ion implantation by forming the first dopant concentration on the surface of the substrate, and the second manufacturing condition comprises performing channel-ion implantation by forming the first dopant concentration at a position that is deeper than the surface of the substrate. Ideally, the first manufacturing condition comprises performing channel-ion implantation by forming the second dopant concentration, which is higher than the first dopant concentration, at a position that is deeper than the surface of the substrate, and the second manufacturing condition comprises performing channel-ion implantation by forming the second dopant concentration on the surface of the substrate.

The method of generating unique information of a semiconductor device according to the present invention includes generating unique information based on the output of the circuit component of the second circuit. The semiconductor device comprises the first circuit designed in accordance with the first design condition and the second circuit designed in accordance with the second design condition. When the second design condition is compared with the first design condition, the second design condition further includes a factor which increases the variation of the circuit component.

The method of generating unique information of a semiconductor device according to the present invention includes manufacturing the first circuit in accordance with the first manufacturing condition; manufacturing the second circuit in accordance with the second manufacturing condition, wherein when the second manufacturing condition is compared with the first manufacturing condition, the second manufacturing condition further includes a factor which increases the variation of the circuit component; and generating unique information based on the output of the circuit component of the second circuit.

The semiconductor device of the present invention comprises the first circuit manufactured in accordance with the first design and manufacturing conditions, the second circuit manufactured in accordance with the second design and manufacturing conditions (when the second design and manufacturing conditions are compared with the first design and manufacturing conditions, the second design and manufacturing conditions further include a factor which increases the variation of the circuit component), and the generation circuit generating unique information based on the output of the circuit component of the second circuit.

Ideally, the second circuit comprises a plurality of transistors connected in parallel. Said generation circuit comprises a detection circuit and a coding unit. The detection circuit is provided to detect drain currents of the transistors which are turned on. The coding unit generates coding information based on the output of the detection circuit. Ideally, the second circuit comprises multiple sets of inverters, and each set of inverters has two inverters. Said generation circuit includes a circuit which compares the voltage differences between different sets of inverters (when the sets of inverters have leakage currents) to generate a comparison result and generates coding information based on the comparison result.

Effect of the Invention

According to the present invention, the second circuit is manufactured by design condition or manufacturing condition which increases the variation of the circuit components, and the unique information is generated based on the output of the circuit components of the second circuit, which improves the randomness of the unique information. Furthermore, even if the operating conditions are changed, the permanence of the unique information still can be improved.

BRIEF DESCRIPTION OF THE DRAWINGS

The present invention can be more fully understood by reading the subsequent detailed description and examples with references made to the accompanying drawings, wherein:

FIG. 3 is a flowchart illustrating a design method of a semiconductor device according to the first embodiment of the present invention.

FIG. 4 illustrates the design condition of the first embodiment of the present invention.

FIG. 5 illustrates the transistors having different channel width according to the first embodiment of the present invention.

FIG. 7 is a flowchart illustrating a design method of a semiconductor device according to the second embodiment of the present invention.

FIG. 8 illustrates the design condition of the second embodiment of the present invention.

FIG. 9 illustrates a transistor with and without LDD according to the second embodiment of the present invention.

DETAILED DESCRIPTION OF THE INVENTION

Herein, the exemplary embodiments of the invention will be described in detail in reference to the accompanying drawings. Moreover, drawings are shown by emphasizing respective portions for easy understanding, and it should be noted that the dimensions thereof are not identical to those of practical devices.

Embodiments

Figure 1:
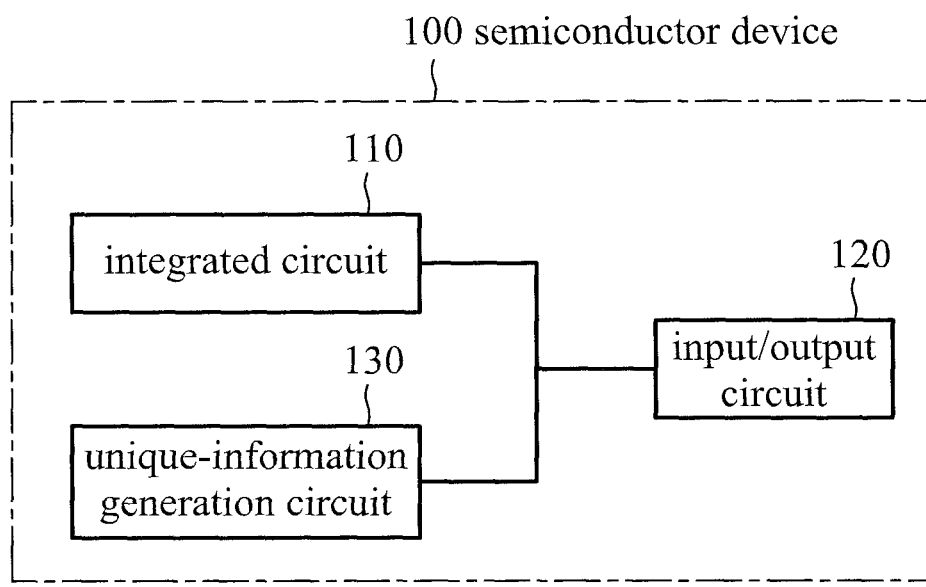
FIG. 1 is a block diagram illustrating a functional structure of a semiconductor device according to an embodiment of the present invention.

FIG. 1 illustrates a schematic of a semiconductor device according to an embodiment of the present invention. The semiconductor device 100 of the present embodiment can have any function and is not limited to the function thereof. The semiconductor device 100 may be the semiconductor memory, semiconductor logic, semiconductor processing circuit, semiconductor driving circuit, central processing circuit, and the like. The semiconductor device 100 can be used in the IC card medium (e.g., the SIM card, credit card, and the card containing an IC), portable terminal (such as the smartphone), electronic device, computer, and any electronic device which needs security.

The semiconductor device 100 has the integrated circuit 110 which performs arbitrary functions, input/output circuit 120, and unique-information generation circuit 130 which generates the unique information of the semiconductor device 100. The input/output circuit 120 can receive an input data from the outside and provide the input data to the integrated circuit 110 or the unique-information generation circuit 130. The input/output circuit 120 can output the execution result of the integrated circuit 110 or the unique information generated by the unique-information generation circuit 130 to the outside.

The semiconductor device 100 is formed by forming a plurality of circuit components (e.g., the transistor, resistor, capacitor, etc.) on the silicon substrate or other substrate (e.g., SiC, GaAs, sapphire, etc.). The circuit component included in the integrated circuit 110 is designed in accordance with the general condition and support the desired function.

Figure 2:
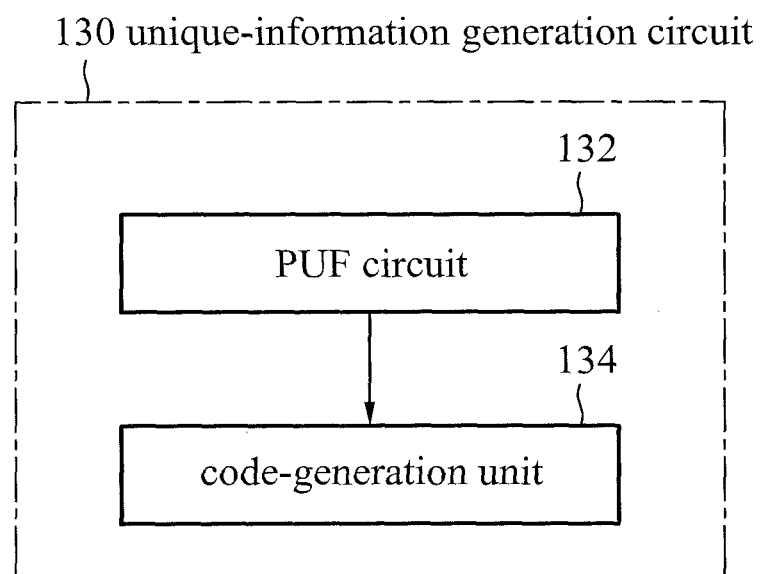
FIG. 2 is a block diagram illustrating the internal structure of the unique-information generation circuit according to the embodiment of the present invention.

The unique-information generation circuit 130 generates the unique information of the semiconductor device based on the output of the circuit components formed in the semiconductor device 100 (ideally, the output of the transistor and the inverter). FIG. 2 illustrates the internal structure of the unique-information generation circuit 130. The unique-information generation circuit 130 includes the PUF circuit 132 and the code-generation unit 134 which generates code information based on the output of the PUF circuit 132. The PUF circuit 132 is formed by the circuit components which include the transistor. The design condition of the PUF circuit 132 is different from the design condition of the integrated circuit 110, and is designed in accordance with the design condition which increases the variations (or process variation) of the circuit components.

FIG. 3 illustrates the design method of the integrated circuit 110 and the PUF circuit 132 according to the present embodiment. Here, the transistor represents the circuit component. The n-type or p-type MOS transistor included in the integrated circuit 110 is designed to meet the required operating conditions. Moreover, on the basis of the minimum manufacturing size, the channel length (L) and the channel width (W) of the transistor are designed by using the general design condition (S100). However, it does not mean that all of the transistors are designed with the minimum manufacturing size, but it means that the transistor may be designed with the minimum manufacturing size. On the other hand, the embodiment is designed to meet the required operating conditions. The general design condition reduces the variation (fluctuation) of the transistor of the integrated circuit 110. Therefore, the threshold values of the transistors of the integrated circuit 110 are designed to remain uniform.

The PUF circuit 132 is designed in accordance with the design condition of the PUF which increases the variation (deviation) of the transistor (S110) and is different from the general design condition of the integrated circuit 110. As a result, the variation of the threshold values of the transistors of the PUF circuit 132 is increased. When the variation of the transistors is used for the unique information, the large variation of the transistors can generate the randomness of the unique information and suppress the effects caused by the operating conditions and the noise, which makes the unique information permanent.

FIG. 4 illustrates an example of the design condition of the present embodiment. The transistor of the integrated circuit 110 is designed to have channel width W1 to meet the required operating condition. It is known that the channel width can affect the variation of the transistor. When the channel width is increased, the variation of the threshold value of the transistor is reduced. On the contrary, when the channel width is reduced, the variation of the threshold value of the transistor is increased. Therefore, the channel width W1 of the transistors of the integrated circuit 110 is designed to be as large as possible.

On the other hand, since the transistors of the PUF circuit 132 are designed to have the large variation, the channel width W2 is designed to be as small as possible. However, the channel width W2 is not less than the minimum manufacturing size. The schematic (A) in FIG. 5 shows the transistor of the integrated circuit 110, and the schematic (B) in FIG. 5 shows the transistor of the PUF circuit 132. If the channel length L of the transistor in the integrated circuit 110 is equal to the channel length L of the transistor in the PUF circuit 132, the channel width W2 can be designed to be less than the channel width W1.

Figure 5A:
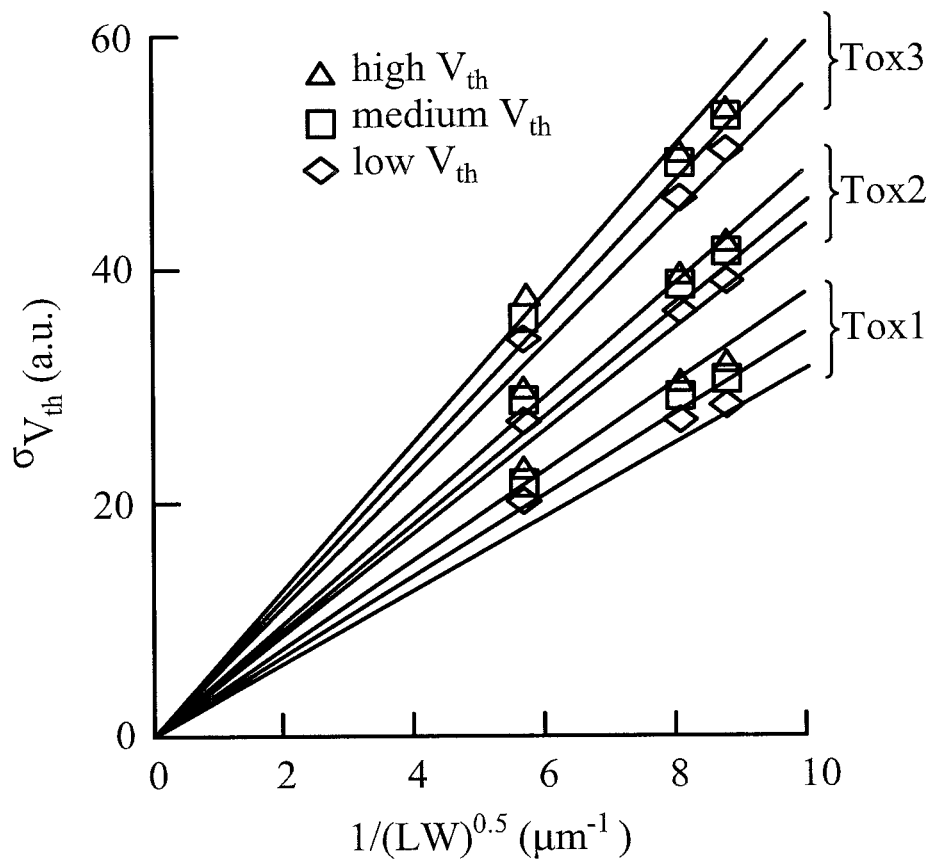
FIG. 5A illustrates the relationship between the channel width and the variation of the threshold voltage of the transistor.

FIG. 5A illustrates the relationship between the channel width and the variation of the threshold value. The horizontal axis is $1/(LW)^{0.5}$ ($\mu m^{-1}$), and the channel width W is expressed in reciprocal when the channel length L remains constant. The vertical axis is the threshold value. Tox1, Tox2, Tox3 (Tox1<Tox2<Tox3) are the film thickness of the gate oxide films. △ indicates the high Vth, □ represents the medium Vth, and ◇ represents the low Vth. Regarding the same figure, when W becomes smaller (more rightward), the distances between the high Vth, medium Vth, and the low Vth becomes larger, which means that the variation (deviation) of the threshold values Vth is increased. That is, the channel width is inversely proportional to the variation of the threshold value.

Figure 6:
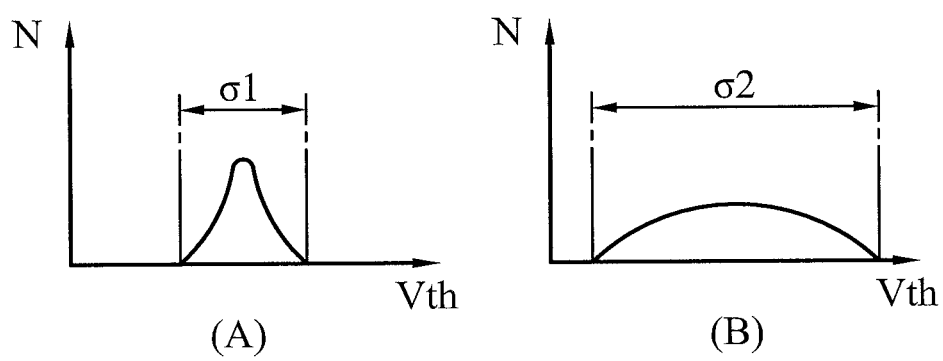
FIG. 6 illustrates the variation of the transistor produced by the design condition of the first embodiment of the present invention.

In this embodiment, when the integrated circuit 110 is designed in accordance with the general design condition and the PUF circuit 132 is designed in accordance with the design condition including an increasing-variation factor, the threshold values Vth of the transistors in the integrated circuit 110 have the normal distribution σ1 as shown in graphic (A) of FIG. 6, and the threshold values Vth of the transistors in the PUF circuit 132 have the distribution σ2 showing a large variation (fluctuation). Therefore, the randomness (non-predictability) of the variation of the transistors in the PUF circuit 132 is higher than the randomness (non-predictability) of the variation of the transistors in the integrated circuit 110.

Next, a method of manufacturing a semiconductor device according to the second embodiment of the present invention is described below. FIG. 7 is a flowchart of the method of manufacturing a semiconductor device according to the second embodiment. In the second embodiment, the integrated circuit 110 is manufactured in accordance with the general manufacturing condition which has the small variation of the transistors, high reproducibility, and high reliability (S200). On the other hand, the PUF circuit 132 is manufactured in accordance with the manufacturing condition of PUF which is different from the general manufacturing condition and includes an increasing-variation factor of the transistors.

FIG. 8 illustrates an example of the manufacturing condition of the second embodiment. In one example, the source/drain diffusion region of the transistor of the integrated circuit 110 has the lightly doped drain (LDD) structure, and the transistor of the PUF circuit 132 does not have the LDD structure. Schematic (A) in FIG. 9 shows the transistor 200 of the integrated circuit 110. The transistor 200 includes the gate electrode 210 and the diffusion region 220 with the LDD structure. The LDD is manufactured by, for example, forming a dopant diffusion region by the first ion implantation (wherein the gate electrode 210 works as a mask), and then forming the side wall 212 on both sides of the gate electrode 210. Next, the second ion implantation is performed (wherein the gate electrode 210 and the side wall 212 work as mask). As other manufacturing methods, the LDD structure may be formed by the rotating-ion implantation.

The schematic (B) in FIG. 9 is the transistor 300 of the PUF circuit 132. The transistor 300 includes the gate electrode 310 and the diffusion region 320 which is not formed with the LDD structure. For example, the diffusion region 320 is formed by implanting the dopant ion (wherein the gate electrode 310 works as a mask). In the transistor 300 without LDD structure, a high electric field is generated between the gate electrode 310 and the diffusion region 320. At least due to the hot-electron injection, the variation of the threshold value becomes larger than the transistor with the LDD structure. When the channel length L of the transistor is reduced, it is desirable to form the LDD structure to suppress the variation. If transistor 200 of the integrated circuit 110 and the transistor 300 of the PUF circuit 132 have the channel length L which is less than a certain value, the LDD structure is formed in the transistor 200, and the LDD structure is not formed in the transistor 300.

In another embodiment, the transistor of the integrated circuit 110 is performed the channel-ion implantation by forming the dopant region with low concentration on the surface of a substrate, and the transistor of the PUF circuit 132 is performed channel-ion implantation by forming the dopant region with low concentration at a position that is deeper than the surface of the substrate. In other embodiments, the transistor of the integrated circuit 110 is performed the channel-ion implantation by forming the dopant region with high concentration at a position that is deeper than the surface of the substrate, and the PUF circuit is performed channel-ion implantation by forming the dopant region with high concentration on the surface of the substrate. In this embodiment, the variation of the transistor is controlled by controlling the depth of the ion implantation. When the concentration of the dopant on the surface of the substrate is increased, the characteristics of the transistor is degraded, which increases the variation.

Figure 10:
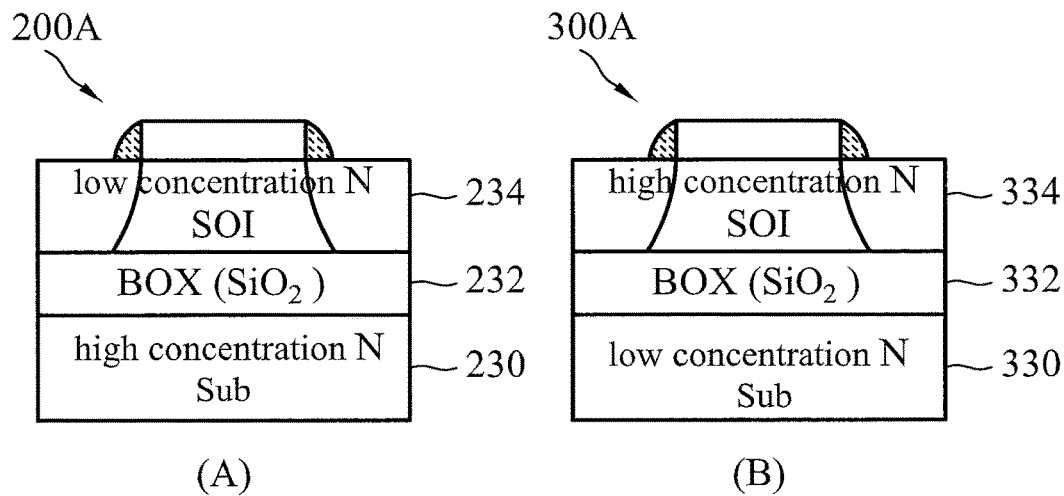
FIG. 10 illustrates the transistors having different doping depth according to the second embodiment of the present invention.

The schematic (A) in FIG. 10 illustrates the transistor 200A of the integrated circuit 110. For example, the BOX layer ($SiO_2$) 232 is formed on the silicon substrate 230 by SIMOX or the substrate bonding method, and the SOI film 234 is formed on the surface of the substrate. The SOI film 234 is the silicon produced by epitaxy. The silicon substrate 230 is doped with a high concentration by the ion implantation, and the SOI film 234 is doped with a low concentration by the ion implantation. The schematic (B) in FIG. 10 illustrates the transistor 300A of the PUF circuit. Regarding the transistor 300A, the silicon substrate 330 is doped with a low concentration by the ion implantation, and the SOI film 334 on the surface of the substrate is doped with a high concentration.

Figure 10A:
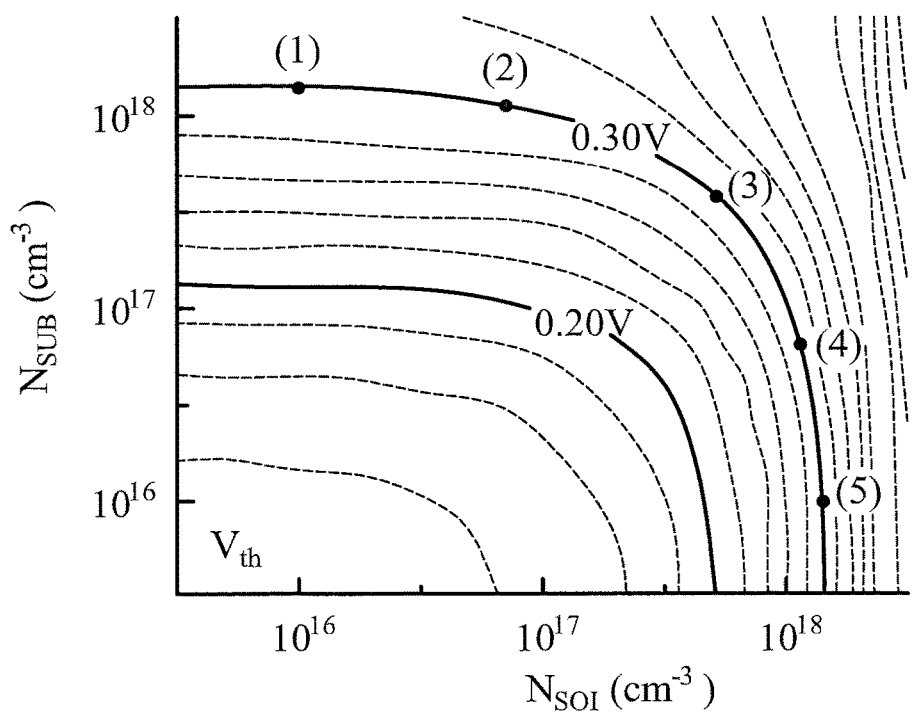
FIG. 10A illustrates the relationship between the dopant concentration of the silicon substrate, the dopant concentration of the SOT film, and the threshold voltage of the transistor.
Figure 10B:
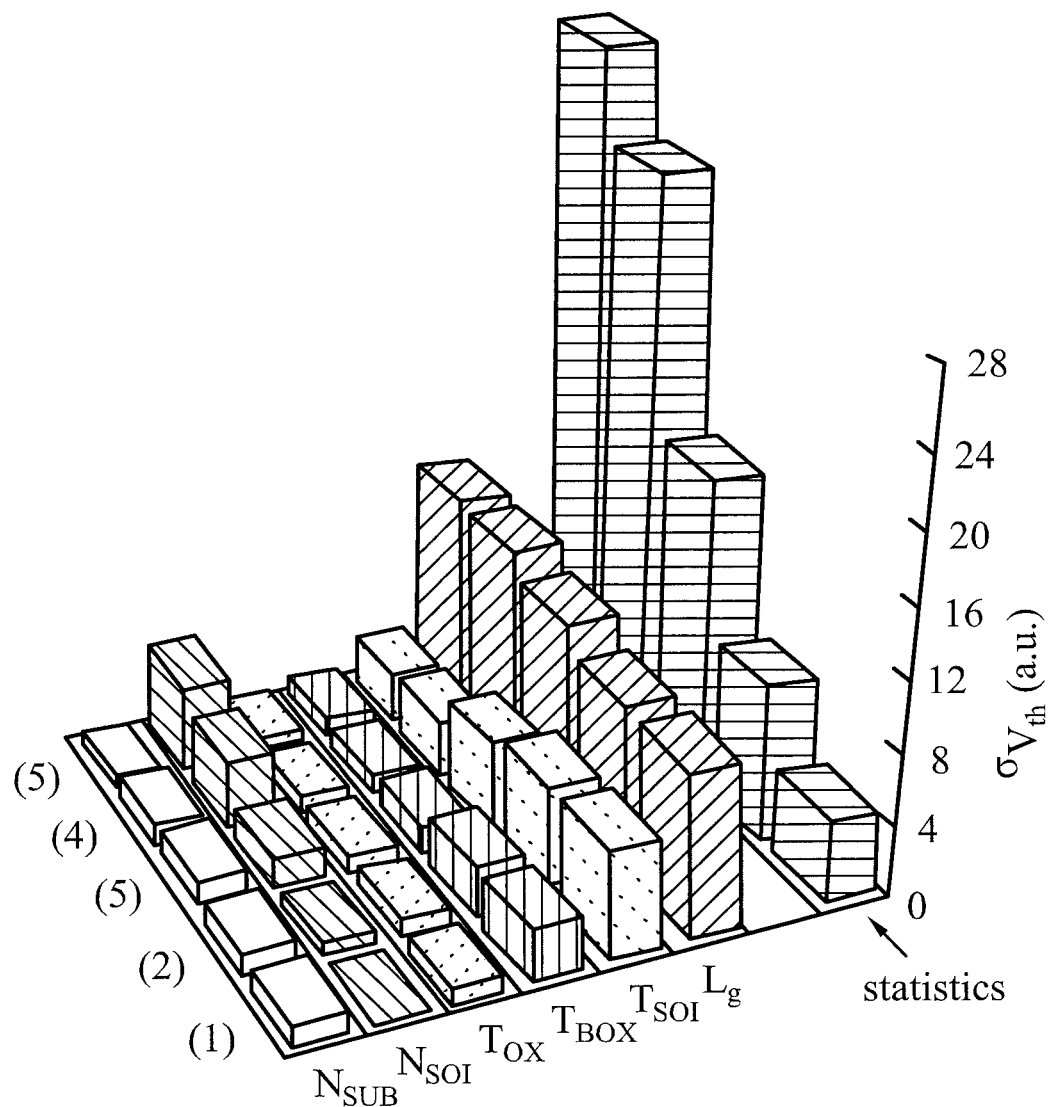
FIG. 10B illustrates the variation distribution of the threshold value of the transistor.

FIG. 10A illustrates the threshold value Vth of the transistor which is determined by the dopant concentration of the silicon substrate (vertical axis) and the dopant concentration of the SOI film (horizontal axis). As the two types of the dopant concentration increase, the threshold value Vth becomes larger. The graph showing the variation of the transistor's threshold values at the sampling points (1)-(5) in the same figure is shown in FIG. 10B. $N_{SUB}$ is the concentration of the substrate, $N_{SOI}$ is the concentration of the SOI film, $T_{OX}$ is the film thickness of the gate oxide film, $T_{BOX}$ is the film thickness of the BOX layer, and $L_g$ is the channel length. Referring the same figure, it can be seen that as the $N_{SOI}$ becomes higher, the variation of the threshold value becomes larger as shown in the statistics. The sampling point (5) represents the maximum, and the sampling point (1) represents the minimum. That is, as the transistor 300A shown in the schematic (B) of FIG. 10, when the dopant concentration of the SOI film 334 becomes higher, the variation of the transistor 300A tends to be larger than that of the transistor 200A.

Figure 11:
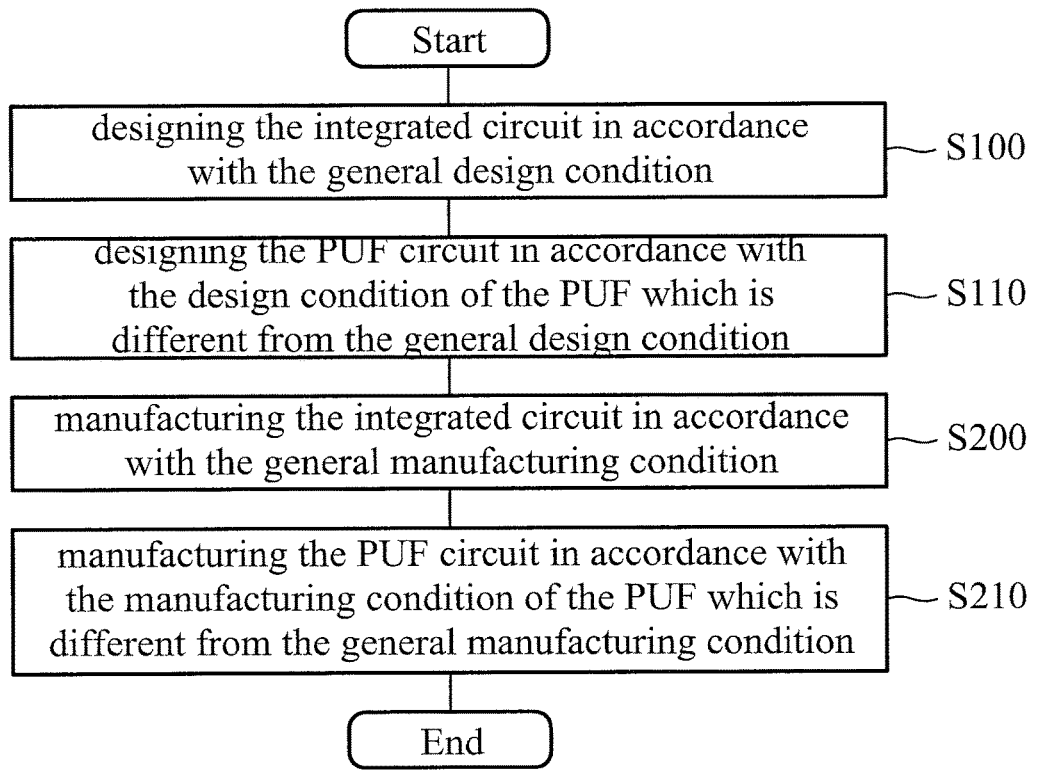
FIG. 11 is a flow chart illustrating a method of manufacturing a semiconductor device according to the third embodiment of the present invention.

The manufacturing method of a semiconductor device according to the third embodiment of the present invention is described below. FIG. 11 illustrates the manufacturing method of the third embodiment. The third embodiment is the combination of the design method of the first embodiment and the manufacturing method of the second embodiment. That is, the transistor of the integrated circuit 110 is designed in accordance with the general design condition and is manufactured in accordance with the general manufacturing condition. The transistor of the PUF circuit 132 is designed in accordance with the design condition of PUF which contains an increasing-variation factor and is manufactured in accordance with the manufacturing condition of PUF which contains an increasing-variation factor. The respective design conditions and manufacturing conditions are described in the first and second embodiments. According to the third embodiment, the variation (fluctuation) of the transistor of the PUF circuit 132 is increased, and the randomness of the variation can be improved.

Figure 12:
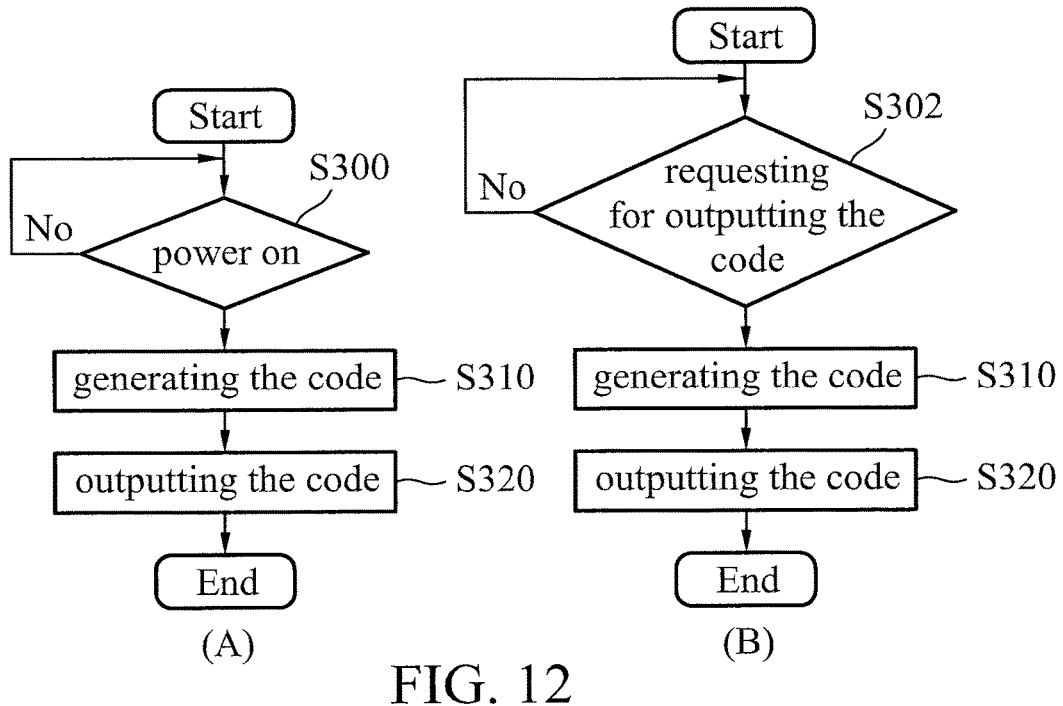
FIG. 12 illustrates the operation of the unique-information generation circuit according to the embodiment of the present invention.

The code-generation unit (FIG. 2) of the present embodiment is described below. The code-generation unit 134 receives the output data of the PUF circuit 132 and generates the unique code in the semiconductor device. FIG. 12 is a flowchart showing the operation of the code-generation unit 134 of the present embodiment. In one example, as shown in part (A) of FIG. 12, when the semiconductor device 100 receives the power (S300), the code-generation unit 134 generates the code based on the output data of the PUF circuit 132 (S310), and the input/output circuit 120 transmits the generated code to the outside (S320). That is, the code of the semiconductor device is outputted as the power-up sequence of the semiconductor device 100.

In the other embodiments, as shown in part (B) of FIG. 12, when the code-generation unit 134 receives the request (through the input/output circuit 120) for outputting the code (S302), the code is generated based on the output data of the PUF circuit 132 (S310), the input/output circuit 120 outputs the generated code to the outside in response to the request (S320). It should be noted that the generated code is not stored in the memory (or the like), and is directly output to the outside through the input/output circuit 120.

The code-generation unit 134 may directly generate the code based on the output data of the PUF circuit 132 or convert the output data of the PUF circuit 132 into other information to generate the code based on the converted information. For example, the output data of the PUF circuit 132 is encoded (e.g., encoded based on a function) to generate the code. For example, the output data of the PUF circuit 132 is utilized to generate the address information, and the memory section is accessed based on the address information to generate the code. The circuit of the code-generation unit 134 is manufactured by the design condition or manufacturing condition which is applied to the integrated circuit 110.

Figure 13:
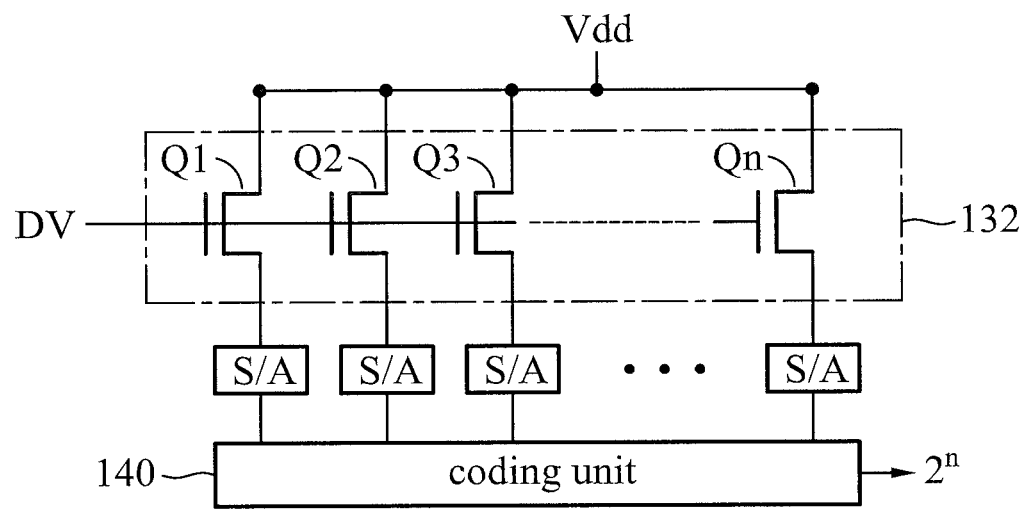
FIG. 13 illustrates the structure of the unique-information generation circuit according to an embodiment of the present invention.

FIG. 13 illustrates the embodiment of the code-generation unit 134. In this embodiment, the PUF circuit 132 is consist of n NMOS transistors Q1, Q2, Q3 . . . Qn connected in parallel. As described in the first to the third embodiments, since the transistors Q1-Qn are manufactured based on the increasing-variation (variation) factor, the variation of the threshold values of the transistors Q1-Qn is large. The n transistors Q1-Qn receive the voltage Vdd, and the gate electrodes are commonly connected to the driving signal DV.

The code-generation unit 134 includes the driving circuit (not shown) which generates the driving signal DV, n current-detection-type sensing amplifiers S/A which are respectively connected to the transistors Q1-Qn, and coding unit 140 encoding the output data of the sensing amplifiers S/A. When the code-generation unit 134 generates the code (e.g., the driving signal DV equal to Vdd is provided to transistors Q1-Qn, which makes the transistors Q1-Qn turn on simultaneously), the variation of the threshold values of the transistors Q1-Qn is increased. Therefore, the variation of the drain currents flowing through the transistors Q1-Qn is increased. The current-detection-type sensing amplifiers S/A respectively detect the drain currents flowing through the transistors Q1-Qn and provide the detection result to the coding unit 140.

The coding unit 140 performs encoding based on the drain currents detected by the sensing amplifiers S/A. The coding unit 140 sets the drain current detected by one sensing amplifier as binary value ("0" or "1"). When the PUF circuit 132 has n transistors Q1-Qn, the coding unit 140 generates $2^n$ encoded serial data.

If the transistors Q1-Qn of the PUF circuit 132 and the integrated circuit 110 are manufactured in accordance with the same general design condition or the general manufacturing condition, the variation of the transistors Q1-Qn performs the normal distribution σ1 as shown in graphic (A) in FIG. 6. Therefore, the variation of the drain currents flowing through the transistors Q1-Qn becomes small, and the coding result of the coding unit 140 has uniformity. That is, the randomness of the generated $2^n$ serial data is reduced.

In addition, the operating characteristics of the transistor are easily affected by the change of temperature, and the small drain current may be affected by the noise of the sensing amplifier. As in the present embodiment, when the variation of the transistor is increased, the margin for coding can be increased. Therefore, the effects caused by temperature and noise are difficult to make the coding result to be changed. That is, the output data of the PUF circuit 132 can be maintained at high permanence.

In the embodiment mentioned above, the coding unit 140 sets the output signal of the sensing amplifier as binary value, but the present invention is not limited to this application. If the variation of the transistor is very large, the output signal of the sensing amplifier may be set as ternary to produce 4-bit data.

Figure 14:
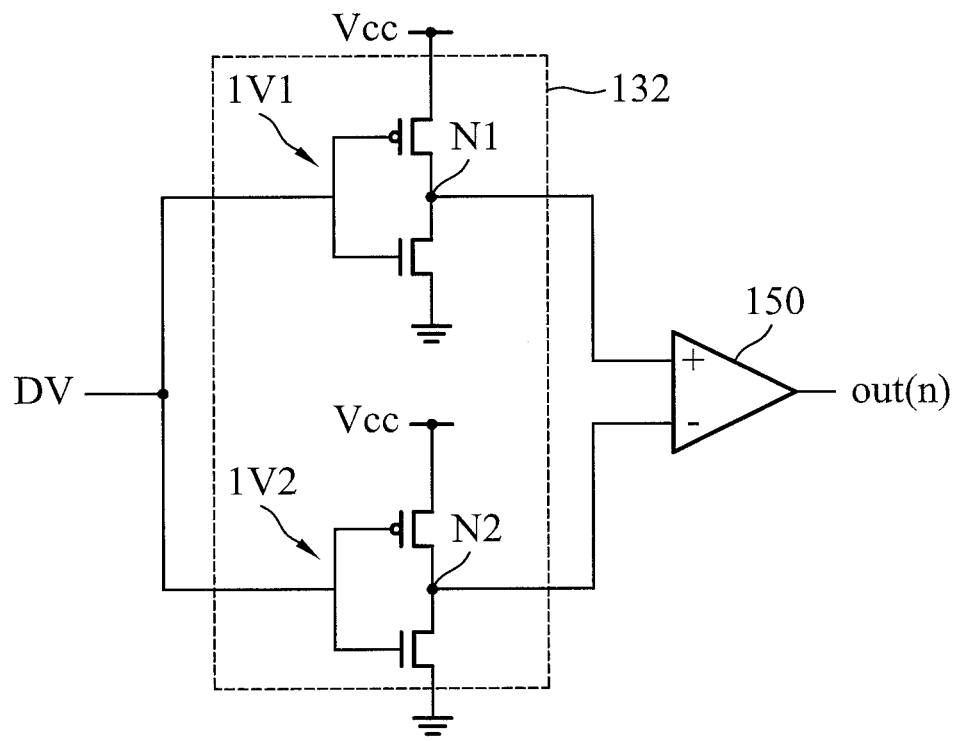
FIG. 14 illustrates the structure of the unique-information generation circuit according to an embodiment of the present invention.

FIG. 14 illustrates other structures of the code-generation circuit. In this embodiment, the PUF circuit 132 includes the inverters IV1 and IV2, wherein the inverters IV1 and IV2 receive electricity from power Vcc. The gate electrodes are commonly connected to the driving signal DV. The code-generation unit 134 includes the driving circuit (not shown) for supplying the driving signal DV, and the comparator (differential amplifier) 150 for receiving the output signals of the inverters IV1 and IV2.

The code is generated when the code-generation unit 134 outputs the driving signal DV to inverters IV1 and IV2. Ideally, the driving signal is ½Vcc. When the inverters IV1 and IV2 receive the driving signal DV (½ Vcc), the inverters IV1 and IV2 conduct the current which is set as the leakage current. Since the variation of the inverters IV1 and IV2 is large, the variation of the leakage currents flowing through the inverters W1 and IV2 is also large. Therefore, the variation of the voltages generated at the output node N1 of the inverter IV1 and the output node N2 of the inverter IV2 is also large. The differential amplifier 150 receives the voltages from the output node N1 and the output node N2 and outputs the data corresponding to the difference between the voltages. In FIG. 14, only one set of inverters IV1 and IV2 is shown. When the PUF circuit 132 consists of n sets of inverters, the n differential amplifiers 150 output 2n serial data.

The code-generation unit 134 is shown as FIG. 13 and FIG. 14. In some embodiments, the code-generation unit 134 may be arbitrarily manufactured by the existing circuits.

Figure 15:
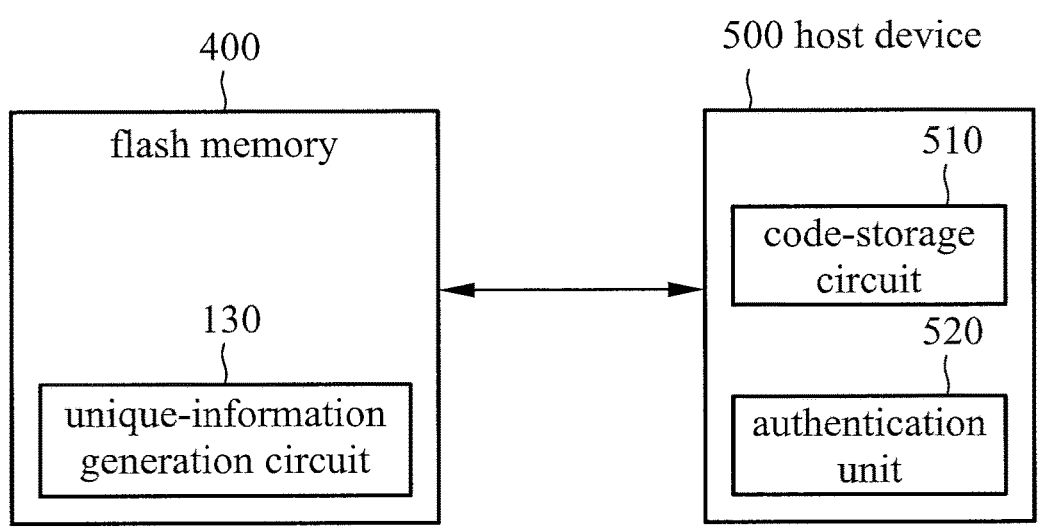
FIG. 15 illustrates the authentication system according to an embodiment of the present invention.

The authentication system including the flash memory with a security function is shown in FIG. 15. The flash memory 400 having the security function includes the unique-information generation circuit 130 as described in the first to third embodiments. The host device 500 includes the code-storage circuit 510 for storing the code of the unique information of the flash memory 400, and the host device 500 also includes the authentication unit 520 for verifying the flash memory 400.

The flash memory 400 outputs the unique information to the host device 500 while being turned on or receiving the request from the host device 500. The authentication unit 520 compares the received unique information with the stored code. If they are matched to each other, then the flash memory 400 is verified. If they are not matched, then the flash memory 400 is identified as the fake or counterfeited product, and the flash memory 400 is not verified. For example, when the flash memory 400 is not authenticated by the host device 500, the host device 500 can disable the operation of the electronic device including the flash memory 400.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of manufacturing a semiconductor device having a function of generating unique information based on an output of a circuit component of a second circuit, the method comprising:
    manufacturing a first circuit and the second circuit;
    manufacturing the first circuit in accordance with a first manufacturing condition; and
    manufacturing the second circuit in accordance with a second manufacturing condition;
    when the second manufacturing condition is compared with the first manufacturing condition, the second manufacturing condition further includes a factor which increases a variation of the circuit component;
    wherein the first manufacturing condition comprises setting a diffusion region of a first transistor having a channel length less than a constant value as an LDD structure and performing a channel-ion implantation by forming a first dopant concentration on a surface of a substrate;
    wherein the second manufacturing condition comprises not setting a diffusion region of a second transistor having a channel length less than the constant value as the LDD structure and performing the channel-ion implantation by forming the first dopant concentration at a first position that is deeper than the surface of the substrate.

2. The method as claimed in claim 1, wherein:
the first circuit is designed in accordance with a first design condition;
the second circuit is designed in accordance with a second design condition; and
when the second design condition is compared with the first design condition, the second design condition further includes the factor which increases the variation of the circuit component.

3. The method as claimed in claim 2, wherein:
the first design condition comprises setting a channel width of the first transistor as a channel width W1;
the second design condition comprises setting a channel width of a second transistor as a channel width W2 which is less than the channel width W1.

4. The method as claimed in claim 3, wherein:
the channel width W1 is a design-allowable value;
the channel width W2 is a value that is less than the design-allowable value.

5. The method as claimed in claim 1, wherein:
the first manufacturing condition comprises performing the channel-ion implantation by forming a second dopant concentration, which is higher than the first dopant concentration, at a second position that is deeper than the surface of the substrate;
the second manufacturing condition comprises performing the channel-ion implantation by forming the second dopant concentration on the surface of the substrate.

6. A method of generating unique information of a semiconductor device, comprising:
manufacturing a first circuit in accordance with a first manufacturing condition;
manufacturing a second circuit in accordance with a second manufacturing condition, wherein when the second manufacturing condition is compared with the first manufacturing condition, the second manufacturing condition further includes a factor which increases a variation of a circuit component; and
generating the unique information based on an output of the circuit component of the second circuit;
wherein the first manufacturing condition comprises setting a diffusion region of a first transistor having a channel length less than a constant value as an LDD structure and performing a channel-ion implantation by forming a first dopant concentration on a surface of a substrate;
the second manufacturing condition comprises not setting a diffusion region of a second transistor having a channel length less than the constant value as the LDD structure and performing the channel-ion implantation by forming the first dopant concentration at a first position that is deeper than the surface of the substrate.

7. The method as claimed in claim 6, wherein the first circuit is designed in accordance with a first design condition and the second circuit is designed in accordance with a second design condition;
when the second design condition is compared with the first design condition, the second design condition further includes the factor which increases the variation of the circuit component.

8. The method as claimed in claim 7, wherein:
the first design condition comprises setting a channel width of a first transistor as a channel width W1;
the second design condition comprises setting a channel width of a second transistor as a channel width W2 which is less than the channel width W1.

9. A semiconductor device, comprising:
a first circuit manufactured in accordance with a first manufacturing condition;
a second circuit manufactured in accordance with a second manufacturing condition, wherein when the second manufacturing condition is compared with the first manufacturing condition, the second manufacturing condition further includes a factor which increases a variation of a circuit component; and
a generation circuit, generating unique information based on an output of a circuit component of the second circuit;
wherein the first manufacturing condition comprises setting a diffusion region of a first transistor having a channel length less than a constant value as an LDD structure and performing a channel-ion implantation by forming a first dopant concentration on a surface of a substrate;
the second manufacturing condition comprises not setting a diffusion region of a second transistor having a channel length less than the constant value as the LDD structure and performing the channel-ion implantation by forming the first dopant concentration at a first position that is deeper than the surface of the substrate.

10. The semiconductor device as claimed in claim 9, wherein:
the second circuit comprises a plurality of transistors connected in parallel;
the generation circuit comprises a detection circuit and a coding unit;
the detection circuit is provided to detect drain currents of the transistors which are turned on;
the coding unit generates coding information based on an output of the detection circuit.

11. The semiconductor device as claimed in claim 9, wherein:
the second circuit comprises multiple sets of inverters, and each set of inverters has two inverters;
the generation circuit includes a circuit which compares the voltage differences between different sets of inverters, when the sets of inverters have leakage currents, to generate a comparison result, and the circuit generates coding information based on the comparison result.

12. The semiconductor device as claimed in claim 9, wherein:
the first circuit is further manufactured in accordance with a first design condition; and
the second circuit is further manufactured in accordance with a second design condition, wherein when the second design condition is compared with the first design condition, the second design condition further includes the factor which increases the variation of the circuit component.

* * * * *